Figure 1:
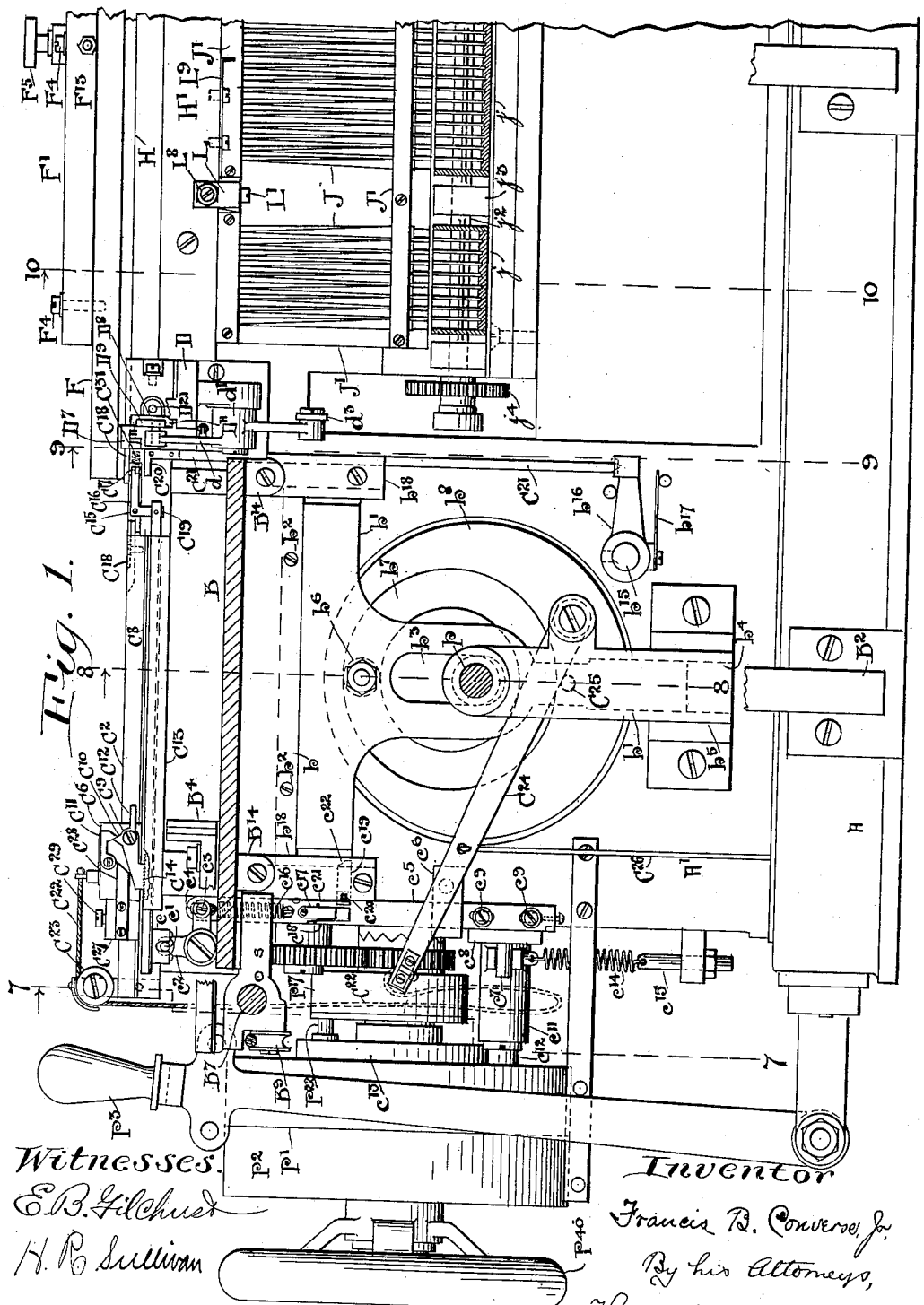

No. 890,265.  
F. B. CONVERSE, Jr.  
DISTRIBUTING MACHINE.  
APPLICATION FILED FEB. 1, 1906.

PATENTED JUNE 9, 1908.

14 SHEETS—SHEET 1.

Witnesses.  
E. B. Gilchrist  
H. B. Sullivan

Inventor  
Francis B. Converse, Jr.  
By his Attorneys,  
Thurston, Bates & Woodward No. 890,265. PATENTED JUNE 9, 1908.
F. B. CONVERSE, Jr.
DISTRIBUTING MACHINE.
APPLICATION FILED FEB. 1, 1906.

14 SHEETS—SHEET 3.

Witnesses
E. B. Gilchrist
H. R. Sullivan

Inventor.
Francis B. Converse, Jr.
By his Attorneys,
Thurston, Bates & Woodward

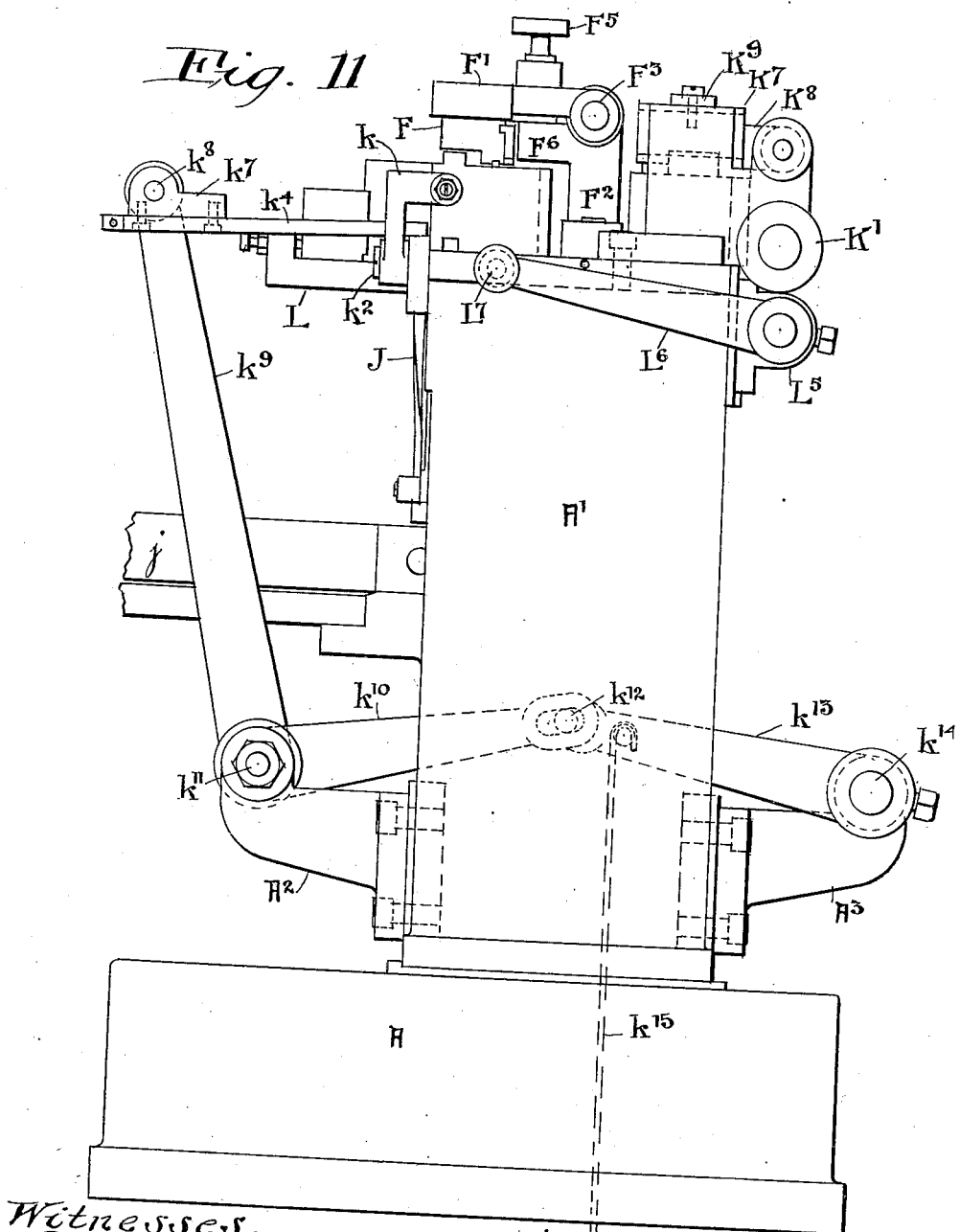

No. 890,265.
F. B. CONVERSE, Jr.
DISTRIBUTING MACHINE.
APPLICATION FILED FEB. 1, 1906.
PATENTED JUNE 9, 1908.
14 SHEETS—SHEET 12.
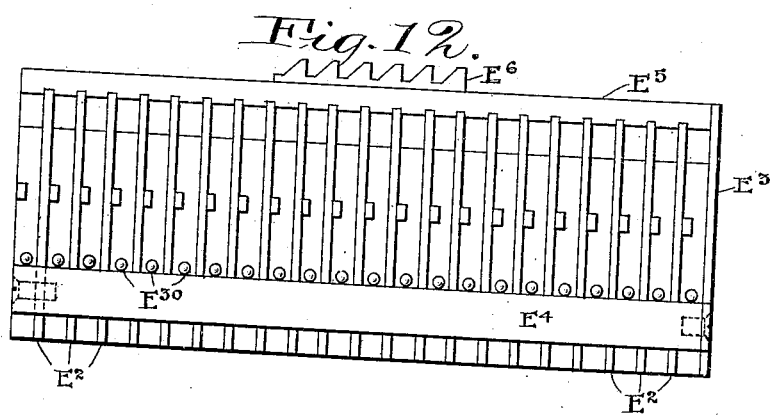
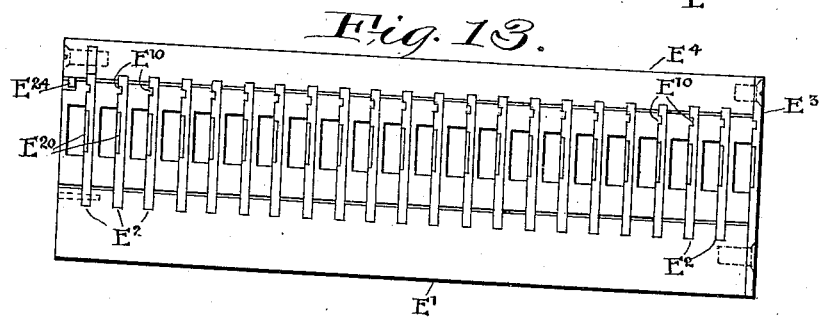
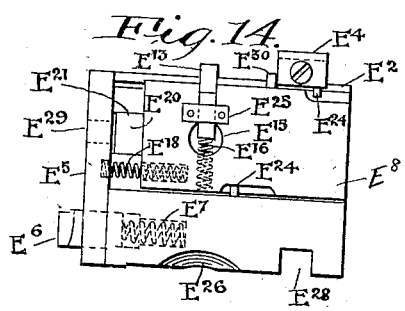
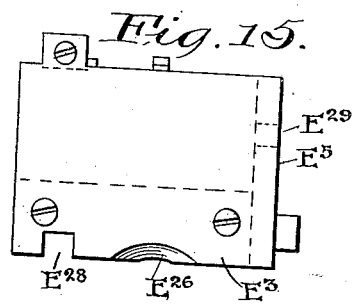
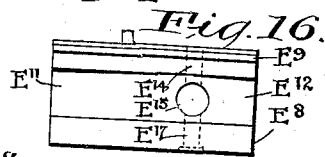
Witnesses
E. B. Gilchrist
H. R. Sullivan
Inventor
Francis B. Converse, Jr.
By his Attorneys,
Thurston, Bates & Woodward
THE NORRIS PETERS CO., WASHINGTON, D. C.

No. 890,265.

F. B. CONVERSE, Jr.
DISTRIBUTING MACHINE.
APPLICATION FILED FEB. 1, 1906.

PATENTED JUNE 9, 1908.

14 SHEETS—SHEET 13.

Witnesses.
E. B. Gilchrist
H. P. Sullivan

Inventor
Francis B. Converse, Jr.
By his Attorneys,
Thurston, Bates & Woodward

UNITED STATES PATENT OFFICE.

FRANCIS B. CONVERSE, JR., OF CLEVELAND, OHIO, ASSIGNOR, BY MESNE ASSIGNMENTS, TO MERGENTHALER LINOTYPE COMPANY, A CORPORATION OF NEW YORK.

DISTRIBUTING-MACHINE.

No. 890,265.

Specification of Letters Patent.     Patented June 9, 1908.

Application filed February 1, 1906.  Serial No. 298,955.

*To all whom it may concern:*

Be it known that I, FRANCIS B. CONVERSE, Jr., a citizen of the United States, residing at Cleveland, in the county of Cuyahoga, and State of Ohio, have invented a certain new and useful Improvement in Distributing-Machines, of which the following is a full, clear, and exact description, reference being had to the accompanying drawings.

This invention relates to a machine for distributing type and more particularly to that class of such machines which operate entirely automatically to remove successive lines of properly nicked type from a galley, transfer them singly to carriers and then by their presentation to successive selectors, to deposit them in their proper channels of type containing cases or magazines.

The object of the invention is to provide a machine of this class which shall be simple, efficient and rapid in operation, and which shall be capable of distributing type of a number of different body widths by means of simple adjustment; and which further shall be capable of separating from each other and distributing into their proper channels by means of a single set of selecting mechanisms, the several characters of two complete fonts of type.

The invention may be described generally as including a galley in which a supply of type to be distributed is furnished to the machine; mechanism for lifting the first line from the galley into a channel, and for feeding this line to a mechanism which removes the type, one by one, from the end of the line and inserts them in carriers which travel in a continuous line and present the type contained therein successively to selector-plates of which there are as many as there are characters of type in one of the fonts to be distributed. These carriers are advanced with a continuous movement along a straight line and present the type to the selectors and eject them at the proper points while moving. The ejected type drop by gravity through channels which lead to the channels of type containing magazines. As each carrier reaches the far end of its travels through the machine, it is returned by proper mechanism to the end of the machine at which it receives a new supply of type and is added to the line of carriers to repeat its travel through the selecting mechanisms.

The machine and the specific mechanisms and their operation will all now be particularly described, reference being had to the accompanying drawings.

Figure 2:
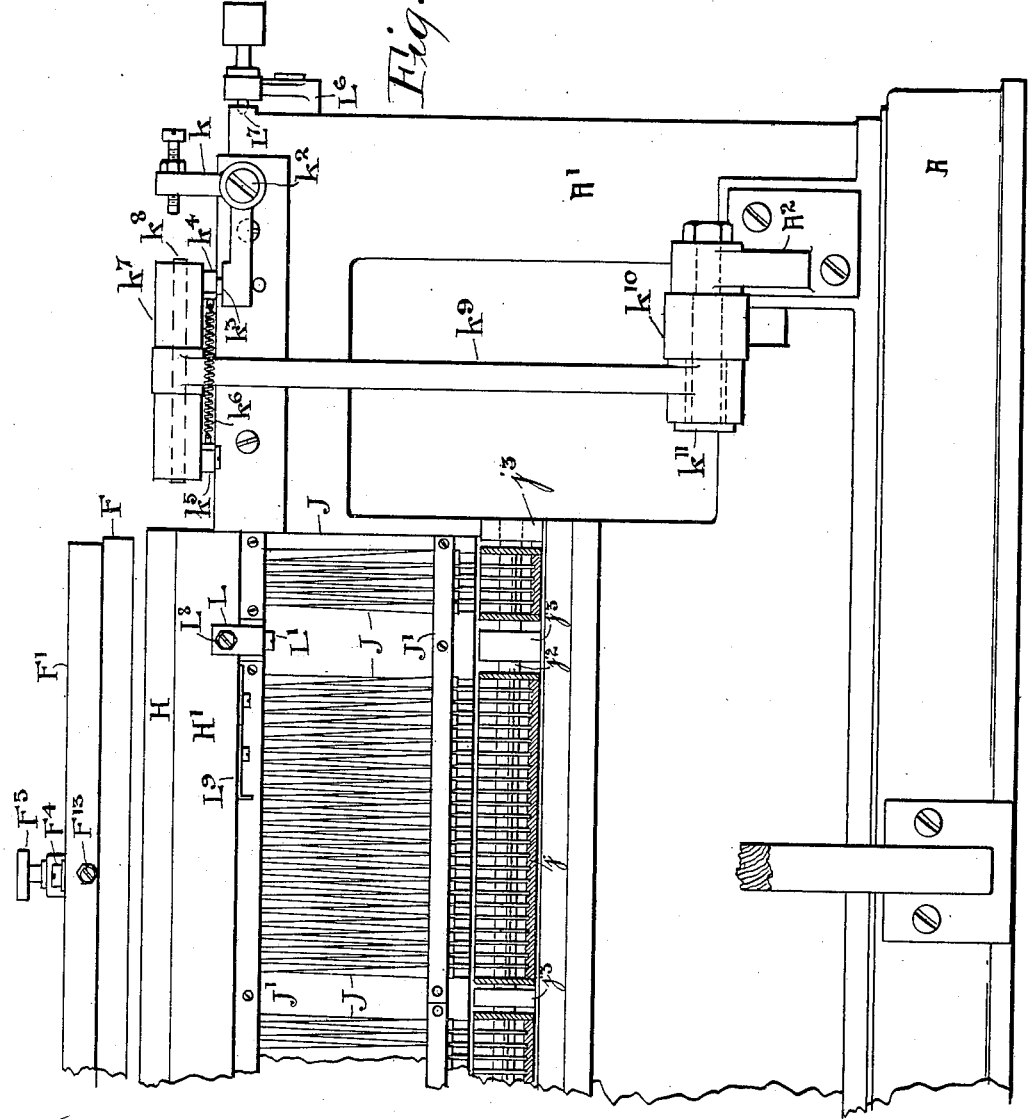
Figure 3:
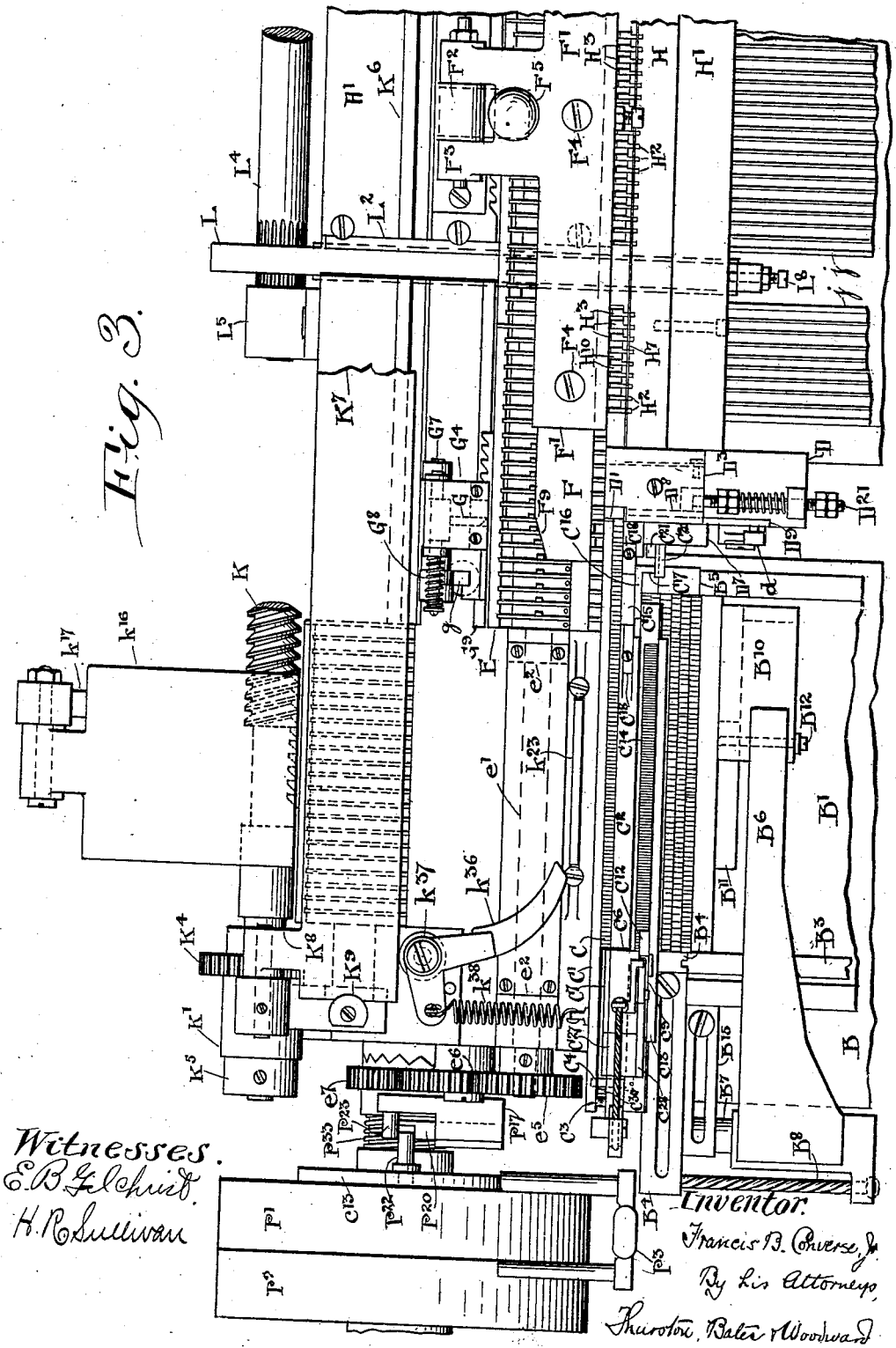
Figure 4:
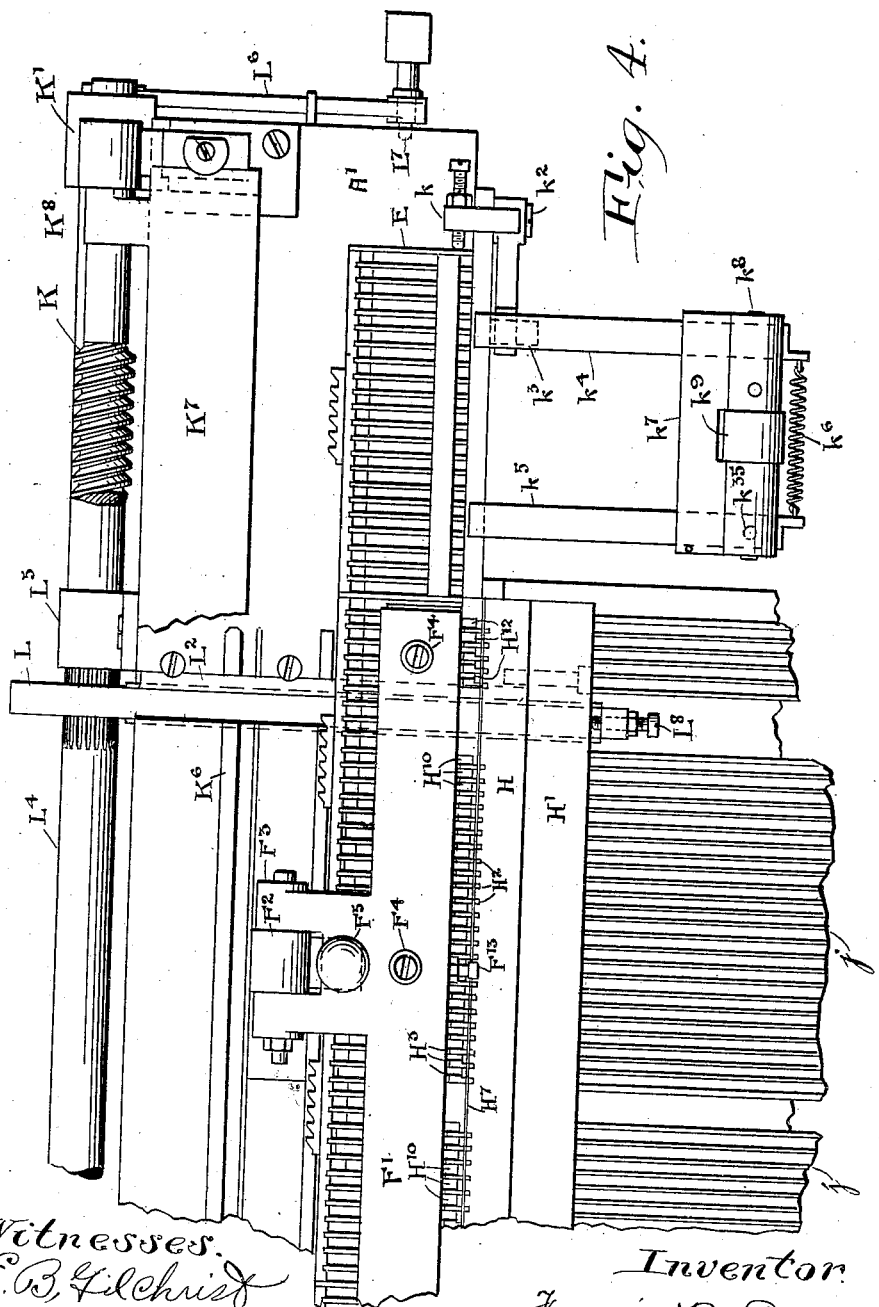
Figure 5:
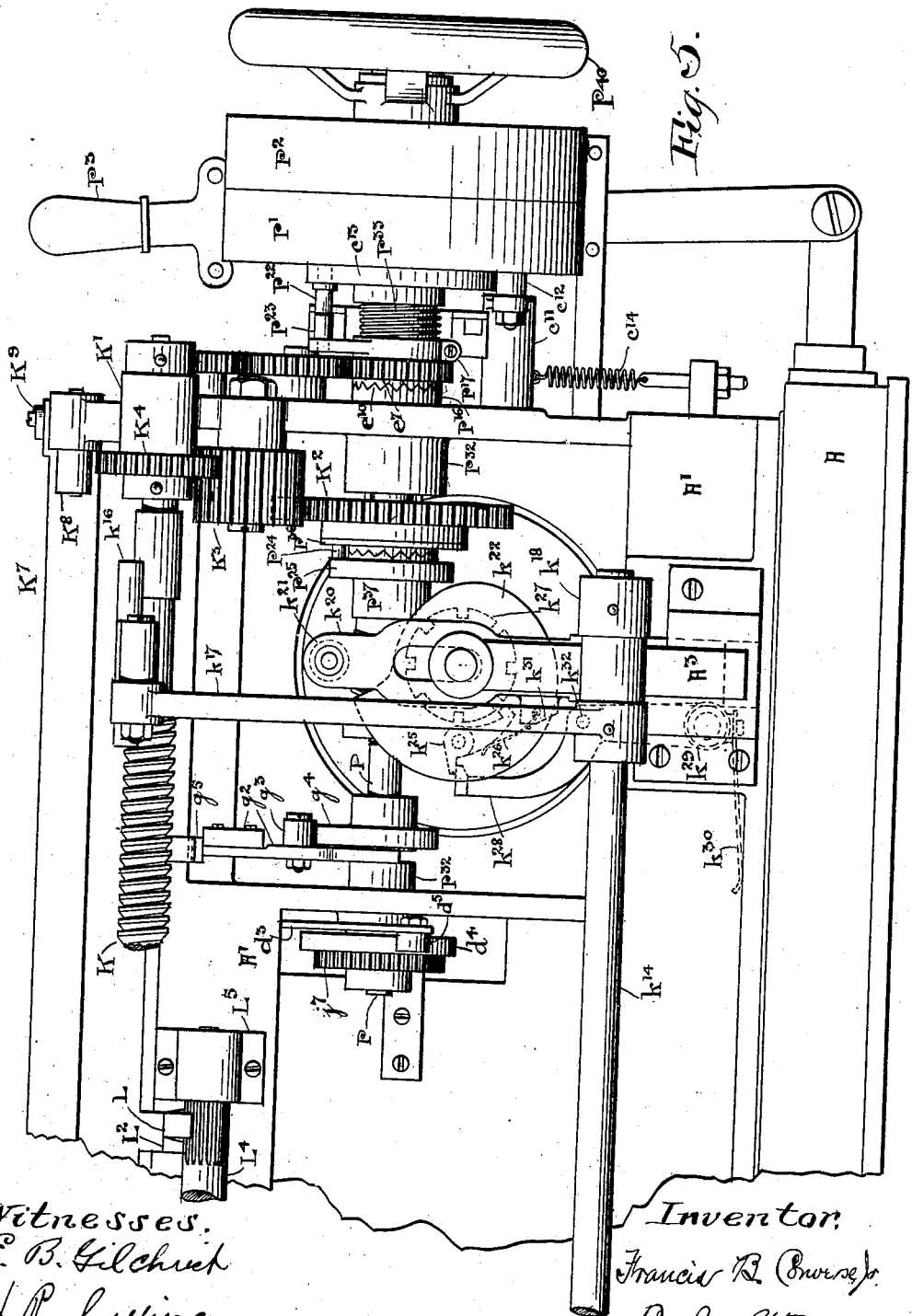
Figure 6:
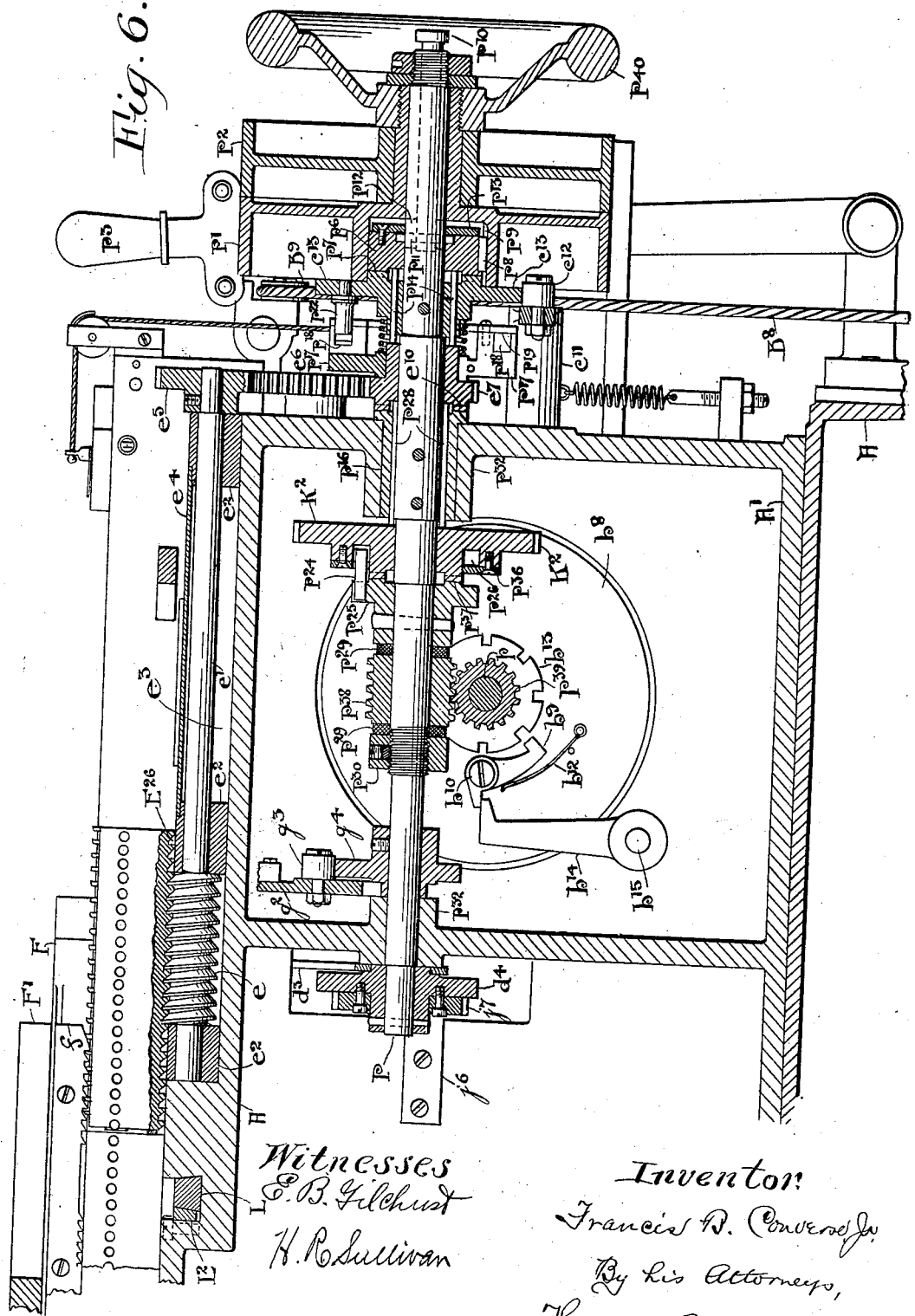
Figure 7:
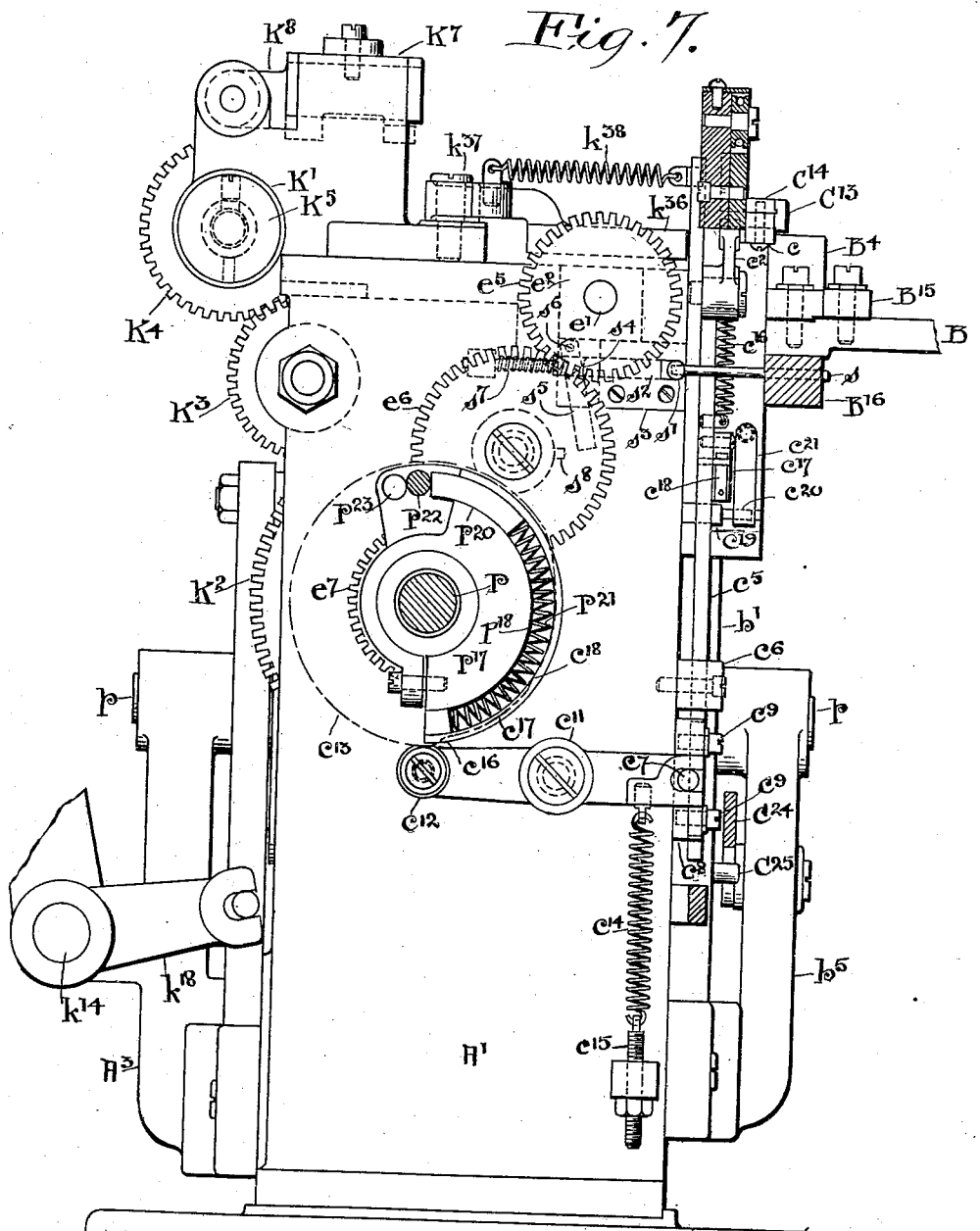
Figure 8:
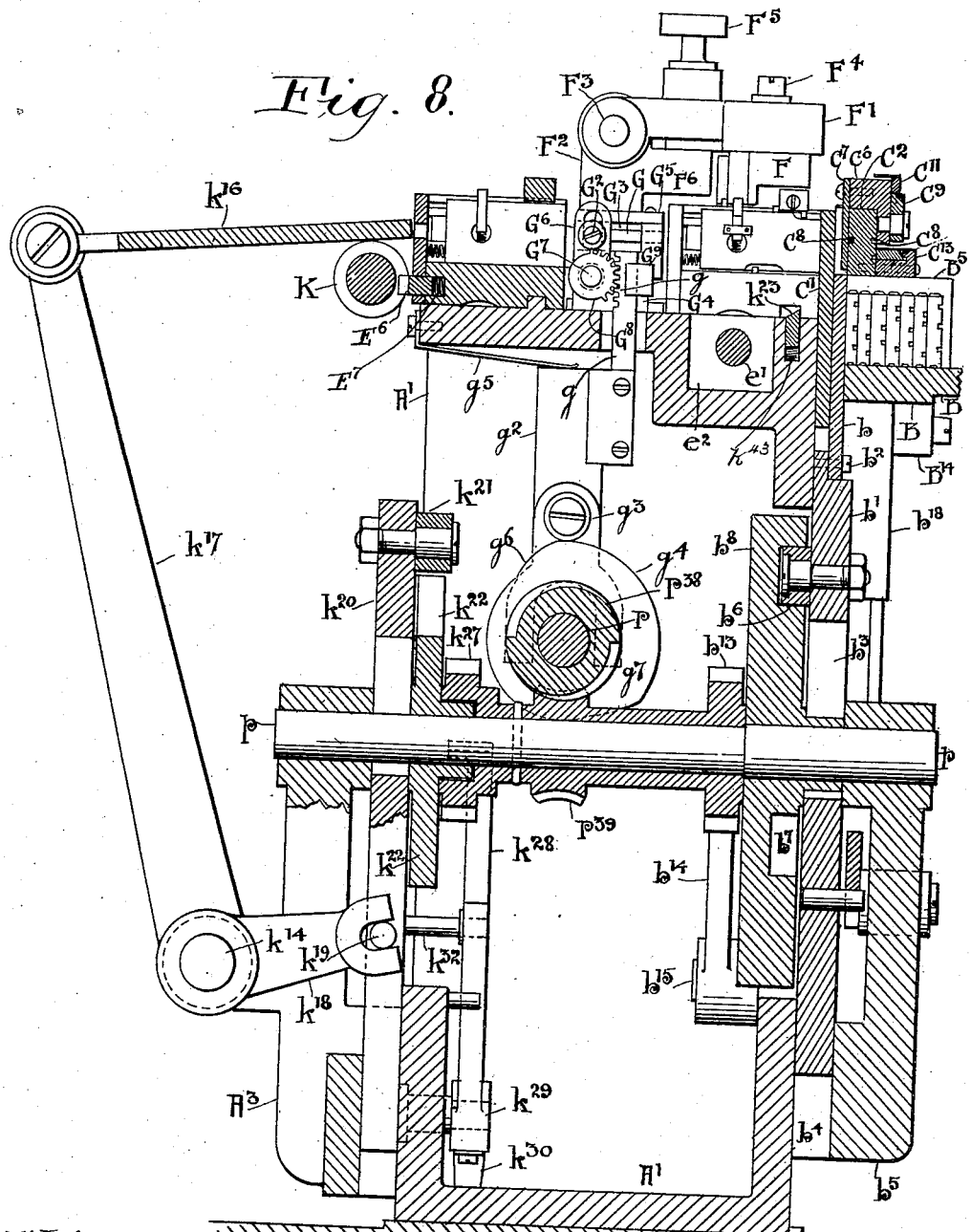
Figure 9:
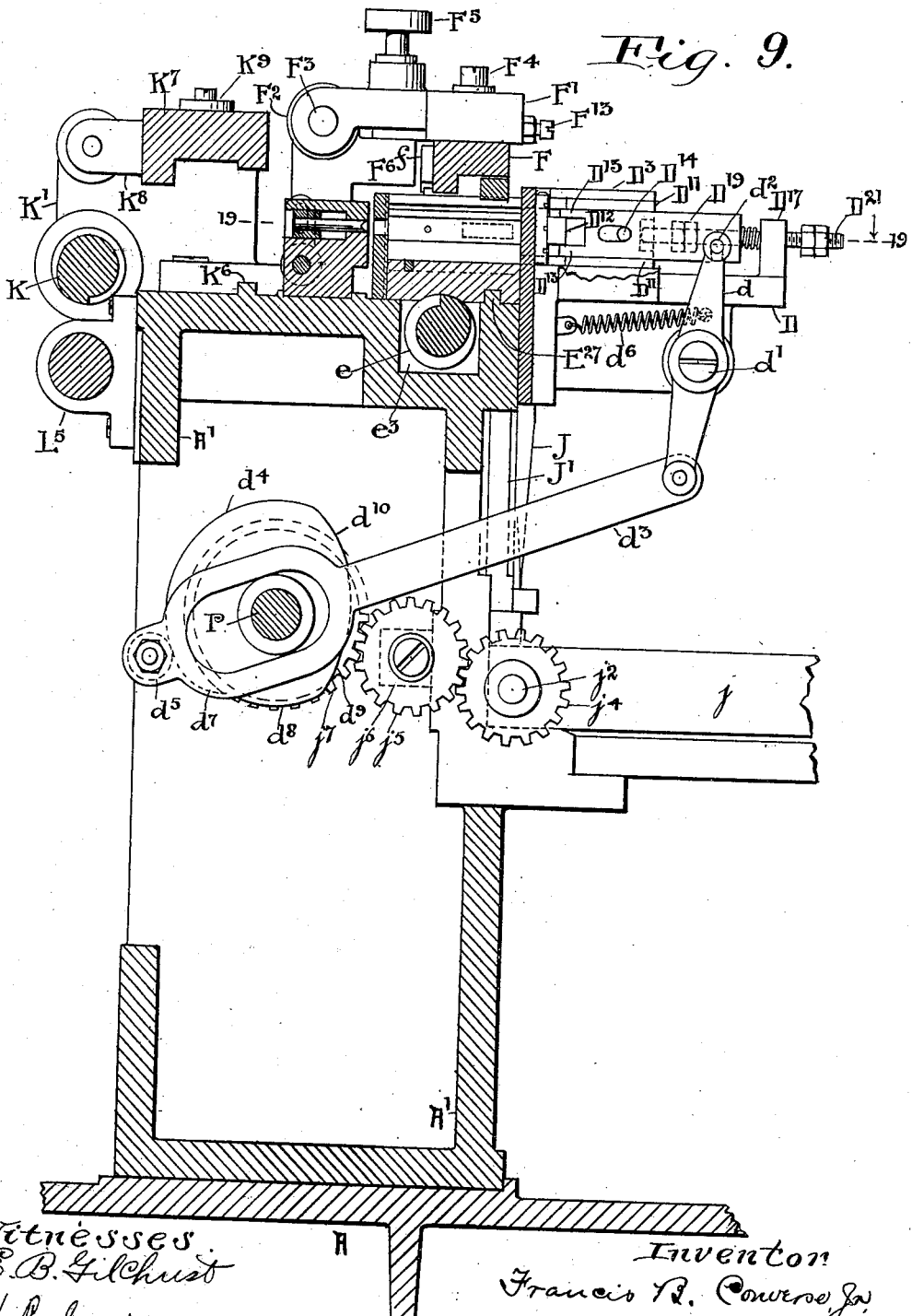
Figure 10:
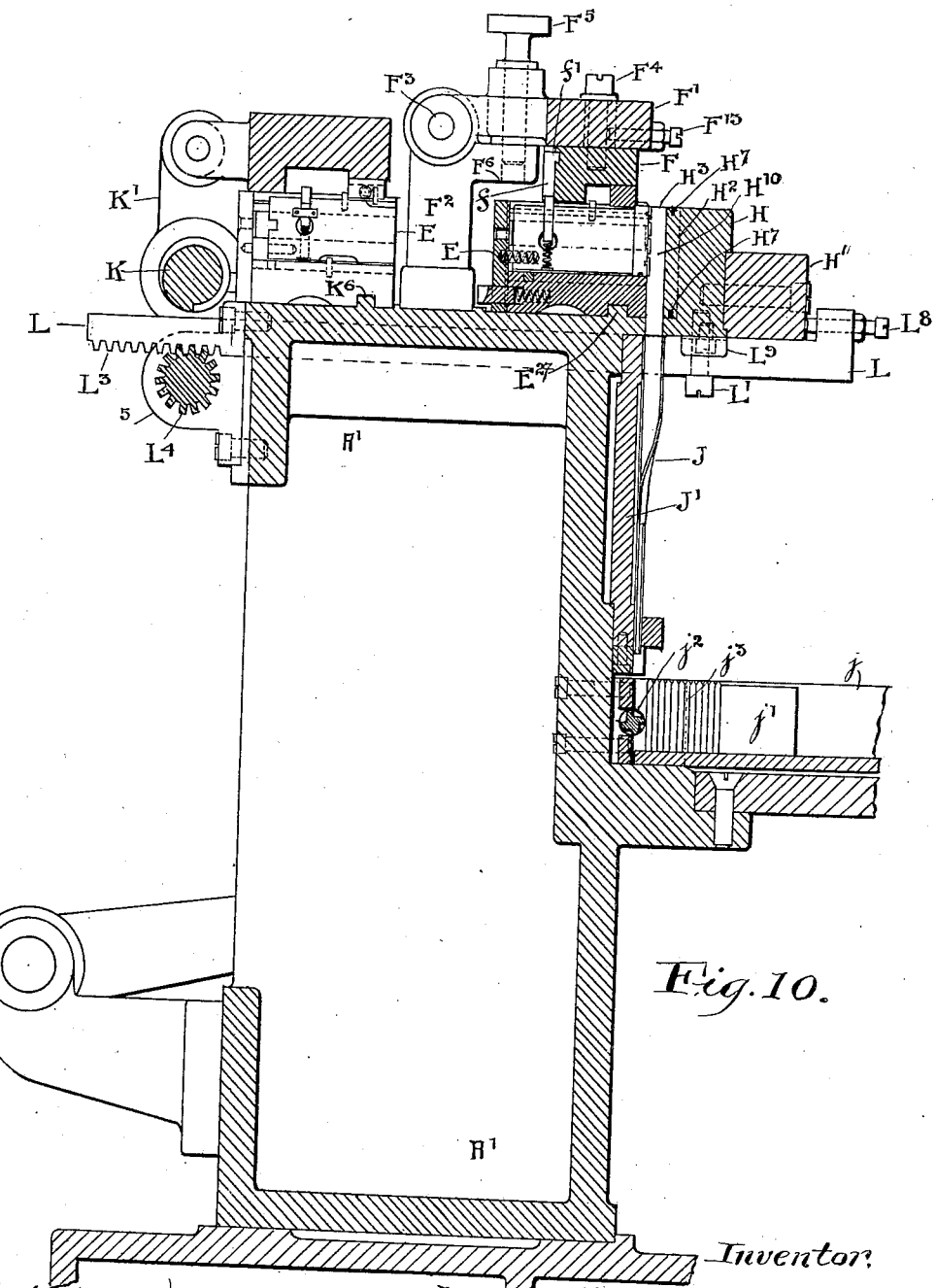
Figure 19:
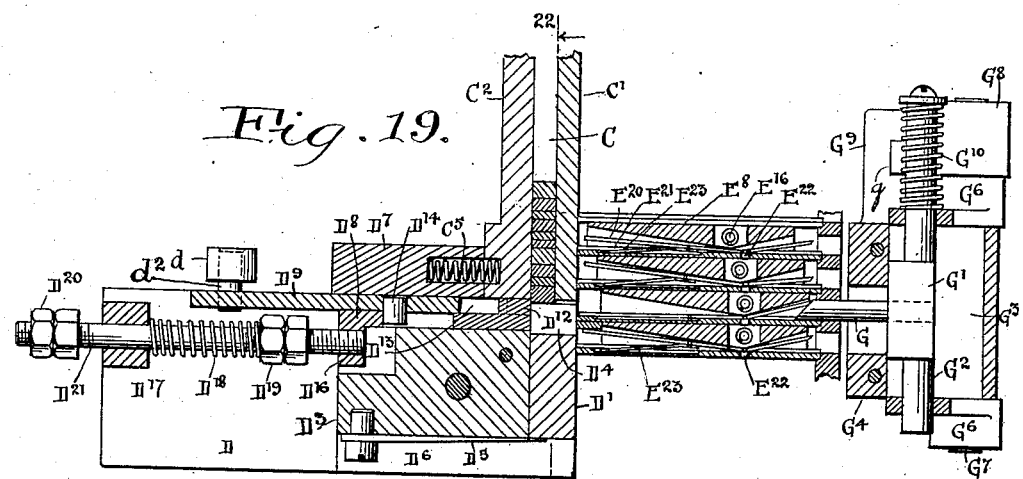
Figure 20:
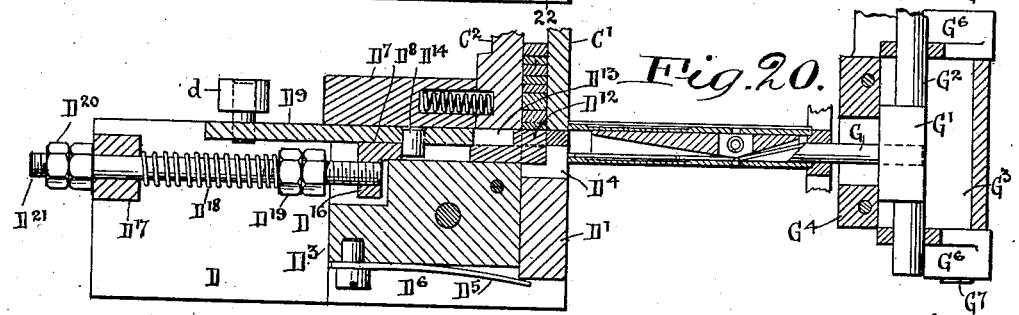
Figure 21:
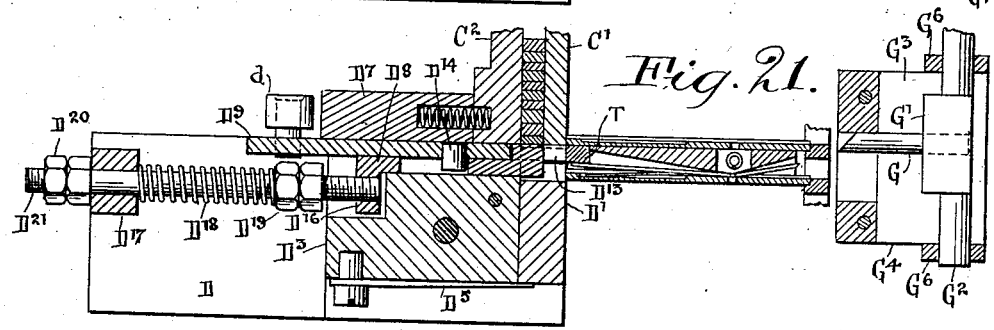
Figure 22:
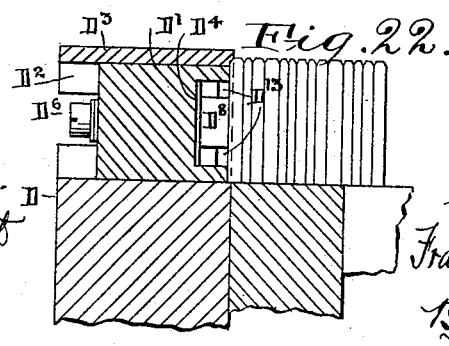
Figure 23:
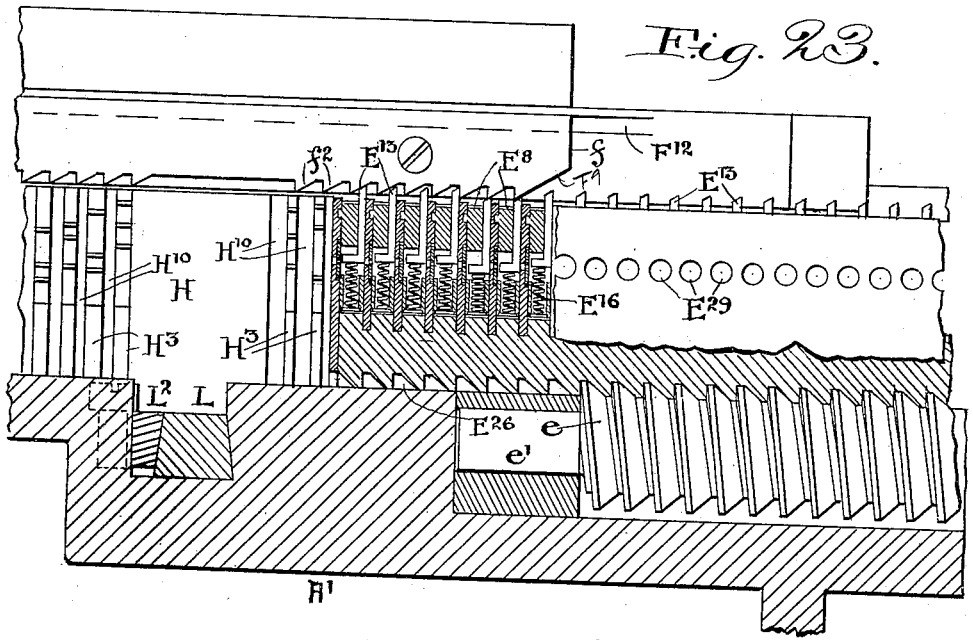
Figure 24:
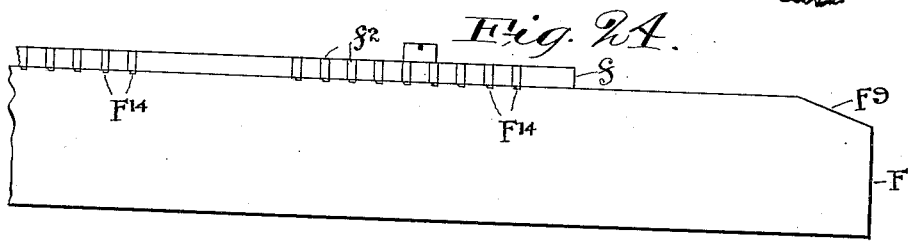
Figures 26, 27, 28:
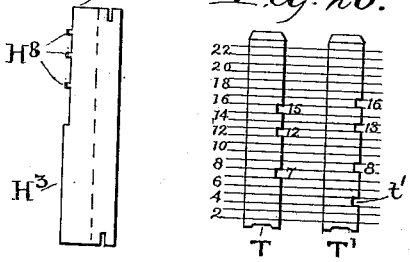
Figure 25:
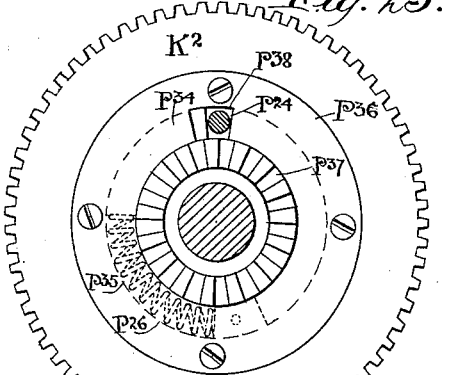

Figure 1 is a front elevation, partly in section, of the left hand end of the machine,— that is, the end of the machine at which the carriers receive their supply of type and start on their travel through the selecting mechanism. Fig. 2 is a front elevation of the right hand end of the machine. A portion of the machine at the center, which is a repetition of the parts shown in both Fig. 1 and Fig. 2, is, for convenience, omitted. Figs. 3 and 4 are plan views of the left hand end and right hand end, respectively, of the machine. Fig. 5 is a rear elevation of the left hand end of the machine. Fig. 6 is a sectional elevation in two planes, on the line 6—6 of Fig. 7, taken from the rear. Fig. 7 is a vertical transverse section on the line 7—7 of Fig. 1 taken from the left. Fig. 8 is a vertical transverse section on the line 8—8 of Fig. 1, taken from the left. Fig. 9 is a vertical transverse section on the line 9—9 of Fig. 1 taken from the left. Fig. 10 is a vertical transverse section taken from the left, at any point through the selecting mechanism, as for instance, on line 10—10 of Fig. 1. Fig. 11 is a right hand end elevation of the machine. Fig. 12 is a plan of one of the carriers used in the machine, of which Fig. 13 is a front elevation; Fig. 14 a left hand end elevation; and Fig. 15 a right hand end elevation. Figs. 16, 17 and 18 are an elevation, plan and end view, respectively, of a carrier follower. Figs. 19, 20 and 21 are horizontal sections through the cut-off mechanism on the line 19—19 of Fig. 9, showing the parts in different positions. Fig. 22 is a vertical section on the line 22—22 of Fig. 19. Fig. 23 is an enlarged view of parts shown in Fig. 6, being a partial vertical section through a carrier in position in the machine and showing the selector-plates in elevation from the rear. Fig. 24 is a bottom plan of the toothed member shown in Fig. 23. Fig. 25 is a detail showing a throw-out mechanism. Figs. 26 and 27 are respectively a side elevation and plan of a selector-plate. Fig. 28 is a diagram illustrating the nicking of the type for use in the machine.

The various mechanisms are supported on a bed-plate A to which are attached the various brackets and supports, the principal of these being the box-like frame $A^1$. This frame has upon its upper face, the race-ways through which the carriers travel in their progress through the machine; supports the galley and the selectors as well as the table for the type magazines, and furnishes bearings for the main driving shaft and other actuating parts which will be particularly described hereinafter.

*Galley feed mechanism.*—Referring to Figs. 1, 3, 6 and 8: A supply of type to be distributed is placed in the machine in an ordinary printer's galley as shown at $B^1$. This galley rests upon the plate B which is secured by lugs $B^{14}$ just in front of an ejector blade $b$. The forward end of this plate is supported by a bracket $B^2$, (the connection not being shown in the drawings). The galley is made wide enough to hold two or more ordinary columns of type, dependent upon the width of the columns. A side-stick $B^3$ holds the type in place on one side, and alines it on that side with the adjustable piece $B^4$ which may be set to accommodate the different widths of line. A stop $B^{15}$, adjusted against the side of the galley retains it against sidewise movement. At the right hand side, the galley alines with a fixed side piece $B^5$. An arm $B^6$ having a bearing upon the rod $B^7$ extends into the galley behind the type. A cord $B^8$ secured to this arm and passing over the roller $B^9$, carries at its lower end a weight (not shown) which tends to advance the type along the galley. A portion $B^{10}$ of this arm, which is within the galley, is made adjustable to different widths of line by means of the piece $B^{11}$ which may be adjusted at any point by means of the screw $B^{12}$ which passes through a slot, as shown.

The ejector blade $b$ heretofore referred to, is secured to a T-shaped slide $b^1$ by means of the screws $b^2$ $b^2$ in such manner that it may be easily removed and a thicker or thinner one substituted as required by the body of the type being distributed. The slide $b^1$ is guided at its upper end by the gibs $b^{18}$, $b^{18}$. It is provided with a slot $b^3$ which passes around the cross shaft $p$ and its lower end is guided in a groove $b^4$ in the bracket $b^5$. It is thus permitted a vertical movement which is controlled through a roller $b^6$ which engages a groove $b^7$ in a cam disk $b^8$. This cam is loose upon the shaft $p$. Pivoted by a screw $b^{10}$ to the rear side of this cam is a pawl $b^9$ which is pressed by a spring $b^{12}$, also fastened to the cam, toward a clutch member $b^{13}$ which is continuously revolved upon the shaft $p$ as hereafter explained. This clutch consists of a disk having square notches cut in its periphery with which the end of the pawl $b^9$ may engage. This pawl is normally held out of engagement with the clutch disk by the lever-arm $b^{14}$ which is pivoted at $b^{15}$ in the frame $A^1$. The cam $b^8$ being caused at the proper time, as hereafter explained, by the clutch $b^{13}$ to make one complete revolution, the ejector blade $b$ is lowered below the bottom of the type galley, whereupon the weight, acting through the arm $B^6$, causes the type to advance, bringing the first line in the galley above the ejector blade. As the blade is thereafter elevated in the course of the revolution of the cam, this line of type is lifted into a channel C, which I shall hereafter refer to as the "cut-off channel."

*Cut-off feed mechanism.*—Referring to Figs. 1, 3, 7 and 8: The cut-off channel C is formed between the plate $C^1$, secured to the upper forward edge of the frame $A^1$, and the bar $C^2$, which is supported at its left hand end by a pin $C^3$ fixed in the plate $C^1$ and projecting into a hole in the bar $C^2$. A screw $C^4$ passes through the bar $C^2$ into the plate $C^1$. A type of the body to be distributed is placed between the plate and the bar adjacent to the pin $C^3$, as at $c^{30}$, and the screw $C^4$ tightened, thus adjusting the width of this end of the channel to the width of the type to be distributed. At the right hand end, the bar $C^2$ is supported upon the bracket D. A spring $C^5$ (Fig. 19), seated in a hole in this bracket, tends to keep the bar $C^2$ pressed against the type within the channel. A block $C^6$ has secured to it on its rear side a plate $C^7$ of substantially the thickness of the thinnest body of type to be used in the machine. This plate projects into the cut-off channel. The block and plate are capable of travel upon the bar $C^2$, being secured thereto by tongues projecting into the grooves $C^8$, $C^8$, formed in the bar. Pivoted to the forward side of the block $C^6$ is a pawl $C^9$ which is provided with a number of small teeth adapted to mesh with the teeth of the rack $C^{14}$. This pawl has an upwardly projecting point $C^{10}$ which is pressed upon by the corresponding point of the spring pressed pawl $C^{11}$, also pivoted to the block $C^6$. The pawl $C^9$ also has the extension $C^{12}$. A gib $C^{13}$, secured to the bar $C^2$, affords a sliding bearing for the rack $C^{14}$ above referred to. This rack has teeth on its upper face, throughout substantially its length. A block $c$ secured to the left-hand end of this rack engages by a slot $a$ pin $c^1$ in a bell-crank lever $c^2$. A pin $c^3$ in the horizontal arm of this lever engages a slot $c^4$ in a link $c^5$ which is carried by a gib $c^6$ on the forward face of the frame $A^1$. A pin $c^7$ projecting from a block $c^8$ which is adjustably secured by means of screws $c^9$, $c^9$, passing through slots, to the link $c^5$, is engaged by the forked end of a lever $c^{11}$. This lever is pivoted to the left hand end of the frame and carries upon its rear end a cam-roll $c^{12}$ engaging a cam $c^{13}$. (This cam being just in front of the section upon which Fig. 7 is taken, it is shown in dot-and-dash lines in that figure.) A spring $c^{14}$ attached to the forward end of the lever and a screw threaded rod $c^{15}$, may have its tension adjusted by a nut to exert a required downward pull upon the forward end of the lever. A spring $c^{16}$ secured to the link $c^5$ and to the end of the lever $c^2$ holds these parts in the relative position shown, with the pin $c^3$ against the bottom of the slot $c^4$. As the power shaft P revolves, the cam $c^{13}$ passing the roller $c^{12}$ permits the spring $c^{14}$ to draw the forward end of the lever $c^{11}$ downward and with it the link $c^5$, thus oscillating the lever $c^2$ to move the rack $C^{14}$ toward the right, thereby advancing the block $C^6$ and its attached plate $C^7$ a short distance in the cut-off channel. This action feeds the type in this channel with a yielding pressure, due to the action of the spring $c^{14}$, toward the cut-off mechanism, by which the type are removed singly from the end of the line and transferred to carriers in a manner to be hereinafter described.

A block $C^{15}$, slidably carried in a groove in the bar $C^2$ and held in place by gibs $C^{18}$, $C^{18}$, has pivoted to it a bell crank lever $C^{16}$ which has a forwardly projecting nose $C^{17}$. A pin $C^{19}$ connects the lower arm of this lever with the rack bar $C^{14}$ in such manner that as the bar reciprocates the bell crank lever is oscillated about this pivot. When the block $C^6$, in feeding the line to the cut-off, reaches the right hand end of its required movement, the projection $C^{12}$ of the pawl $C^9$ will pass beneath the nose $C^{17}$ in such manner as to be engaged on the next downward movement of this arm of the bell-crank lever, thereby depressing the projection $C^{12}$ sufficiently to lift the teeth of the pawl $C^9$ out of engagement with the rack, in which position it is maintained by the pointed projection $C^{10}$ having passed to the opposite side of the pawl $C^{11}$. The block $C^{15}$ is free to move a short distance toward the right against the tension of a spring $C^{31}$, seated in the bar $C^2$. This is necessary because the nose $C^{17}$ is at the bottom of its stroke when the block $C^6$ commences its forward movement. The spring permits the bell crank lever to advance with the block $C^6$ in case the nose of this lever is struck by the projection $C^{12}$ as the block advances.

The projection $C^{12}$, as it passes under the nose $C^{17}$ of the bell crank lever $C^{16}$, overhangs the angle piece $C^{20}$ secured to a square rod $C^{21}$ which has a sliding bearing in a groove in the side of the right hand gib $b^{18}$. The lower end of this rod rests upon the end of a lever arm $b^{16}$ secured to the shaft $b^{15}$ which carries on its rear end the lever arm $b^{14}$, heretofore referred to. A flat spring $b^{17}$ secured to the arm $b^{16}$, maintains the parts in the position shown. Hence, as the projection $C^{12}$ is depressed by the bell crank lever $C^{16}$, the rod $C^{21}$ and lever $b^{16}$ are likewise depressed, causing the lever $b^{14}$ to be oscillated sufficiently to release the pawl $b^9$ to cause a rotation of the cam $b^8$ as above described. The rotation of this cam, as above explained, causes a downward and upward movement of the ejector blade $b$ to feed a new line into the cut-off channel. During the downward movement of the ejector blade, the block $C^6$ is returned to the left hand end of the cut-off channel by a cord $C^{22}$ which is secured to a lug on the block $C^6$, passes over a roller $C^{23}$, and has its other end attached to the end of a lever $C^{24}$. This lever is pivoted to the bracket $b^5$ and rests upon a pin $C^{25}$ projecting from the slide $b^1$. A wire $C^{26}$ hooked to the lever, passes down through the opening in the bed plate and carries at its lower end a weight (not shown). Thus, as the slide $b^1$ descends, the weight secured to the lever $C^{24}$, causes the block $C^6$ to be drawn to the left. As it reaches the end of this movement, the toothed end of the pawl $C^9$ passes under the beveled end of a bar $C^{28}$ secured to a block $C^{27}$ and is depressed thereby into reëngagement with the rack $C^{14}$. The block $C^{27}$ is movably secured to the bar $C^2$ by tongues which project into the grooves $C^8$, $C^8$ above referred to; and may be adjusted in a position corresponding to the length of the line of type being distributed, by means of the set-screw $C^{29}$.

It is necessary that the block $C^6$ should not begin to travel toward the right until the line being elevated into the cut-off channel is fully in position. In order to prevent such movement, a block $c^{17}$ is pivoted at its upper end to the link $c^5$ and is normally held in the position shown by a spring $c^{18}$. Another block $c^{19}$ guided in a groove in the gib is held in the position shown by a spring $c^{21}$ which bears against a pin $c^{20}$. As the slide $b^1$ commences to descend, a bevel $c^{22}$ on its end meets the beveled end of the block $c^{19}$, pressing it outward into the path of the block $c^{17}$. In case the block $c^{19}$ meets the pivoted block $c^{17}$ when the link $c^5$ is in its lowest position, the pivoted block will be thereby swung upon its pivot but will click over the block $c^{19}$ under the action of the spring $c^{18}$ upon the next upward movement of the link $c^5$. This locks the link $c^5$ against further movement until the slide $b^1$ reaches the limit of its upward movement when the spring $c^{21}$ causes the block $c^{19}$ to release the block $c^{17}$ thereupon permitting the advancement of the block $C^4$ to feed the new line toward the cut-off.

*Cut-off mechanism.*—Referring to Figs. 1, 3, 9, and 19 to 22 inclusive: The cut-off channel C ends just short of a block $D^1$. This block is slidable in an opening $D^2$ formed between the piece $D^3$ and the face of the bracket D. The left hand end of this block $D^1$ is recessed at $D^4$. A spring $D^5$ secured in a slot $D^6$ tends to maintain the block in its normal position, as shown in Fig. 19. In a recess formed in the left hand edge of the block $D^3$ and between it and the upward projection $D^7$ of the bracket D, two pieces $D^8$ and $D^9$ have a bearing. The piece $D^8$, which I term the "cut-off slide" has the projecting end $D^{12}$ and at its upper and lower edges the flanges $D^{11}$ embracing the piece $D^9$. This piece $D^9$ referred to as the "cut-off ejector" has the projections $D^{13}$ which pass across the projection $D^{12}$ of the slide. A pin $D^{14}$ secured to the ejector $D^9$ engages a slot in the slide $D^8$. A rod $D^{21}$, secured to the lug $D^{16}$ of this slide $D^8$, passes through a lug $D^{17}$ on the bracket D and a spring $D^{18}$ between the lug and the lock-nuts $D^{19}$ on the rod exerts a rearward pressure on the slide $D^8$. Lock-nuts $D^{20}$ on the forward end of the rod $D^{21}$ limit the rearward movement of the slide $D^8$. A lever $d$ pivoted at $d^1$ to the bracket D has a pin $d^2$ at its upper end which engages a slot in the ejector $D^9$. The lower end of this lever is pivoted to a link $d^3$ which, at its rear end, surrounds the hub of a cam $d^4$ and carries a roll $d^5$ which engages the periphery of this cam. A spring $d^6$ tends to draw the upper end of the lever $d$ rearward against the action of the cam $d^4$. The action of these parts is as follows: As the power shaft P revolves, the decreasing face $c^{16}$ of the cam $c^{13}$ permits the spring $c^{14}$ to draw downward the link $c^5$, thus advancing, in the manner above described, the block $C^6$ to press the type in the cut-off channel against the block $D^1$. The throw of the link $c^5$ due to this decreasing face of the cam is slight, not exceeding the play between the link and the lever $c^2$ afforded by the slot $c^4$. Hence the block $C^6$ is advanced by a pressure which is exerted by the spring $c^{16}$, the tension of which is not sufficient to overcome the tension of the spring $D^5$ against the block $D^1$. During the passage, therefore, of the concentric face $c^{17}$ on the cam $c^{13}$, the forward type in the cut-off channel C stands, as shown in Fig. 19, projected slightly into the path of the extension $D^{12}$ of the slide $D^8$. While this concentric face is passing the roll on the lever $c^{11}$, the decreasing face $d^7$ of the cam $d^4$ passing the roll $d^5$, permits the spring $d^6$ to move the upper end of the lever arm $d$ toward the type. This permits the extension $D^{12}$ of the slide $D^8$ to press against the projecting corner of the first type in the cut-off channel. In this position, and during the passage of the concentric face $d^8$ of the cam $d^4$, a second decreasing face $c^{18}$ of the cam $c^{13}$ permits further downward movement of the link $c^5$, the full tension of the spring $c^{14}$ now acting, (the upper end of the slot $c^4$ having engaged the pin in the lever $c^2$) to advance the type against the tension of the spring $D^5$. As soon as the first type in the cut-off channel has passed completely in front of the end of the slide $D^8$, the tension of the spring $D^{18}$ causes the slide $D^8$ to snap rearward as far as permitted by the nuts $D^{20}$, carrying the engaged type ahead of it. This is the resulting position of the parts as shown in Fig. 20. Following this action, the decreasing face $d^9$ of the cam $d^4$ permits further rearward movement of the upper end of the lever $d$ under the action of the spring $d^6$, causing the projections $D^{13}$, $D^{13}$ of the ejector $D^9$ to advance the type that has thus been separated from the end of the line into the channel of the carrier, which at this time is alined with the cut-off mechanism. As the type is shoved from the cut-off into the carrier, the block $D^1$ is returned by the spring $D^5$ to its normal position, as shown in Fig. 21, to receive the succeeding type of the line as the pieces $D^8$ and $D^9$ are retracted by the increasing face $d^{10}$ of the cam $d^4$. The carrier which receives the type from the cut-off and conveys it through the selecting mechanism will now be described.

*Carriers.*—Referring to Figs. 12 to 18 inclusive: The carrier E consists of a base plate $E^1$ into which partitions $E^2$ are mortised. An end piece $E^3$, of the same thickness as the partitions, is secured by screws to the right hand end of the base. A grooved bar $E^4$ fits over the upper edges of the partitions $E^2$, being secured by screws to the end piece $E^3$, and to the left hand end partition which is mortised into the bar $E^4$ more deeply than the rest, as shown. A grooved plate $E^5$, fitting over the rear ends of the partitions, is secured to the back of the base. A carrier consisting of a block of channels, each channel wide enough to receive the widest type of the largest font to be distributed, is thus formed, the number of channels in a single carrier being simply a matter of convenience.

Carried in a slot in the rear of the base piece $E^1$ and projecting through the back plate $E^5$, is a segment of a nut $E^6$ adapted to coöperate with a worm for the purpose of returning the carrier from the right hand end of the machine to the left hand end, in the manner hereinafter to be described. Springs $E^7$ seated in holes behind this nut $E^6$ maintain it yieldingly in the position shown. A hole $E^{29}$ extending through the plate $E^5$, is alined with each carrier channel as shown.

A follower $E^8$ of the form shown in Figs. 16, 17, 18 and 23 is inserted in each of the carrier channels. This follower consists of a piece of metal of substantially the cross section of a channel, having a rib $E^9$ near its upper edge adapted to engage a slot $E^{10}$ formed in the partitions $E^2$. Beveled grooves $E^{11}$ and $E^{12}$ are cut into the follower from each end. A small L-shaped dog $E^{13}$, (Fig. 23), carried in the slot $E^{14}$ of each follower, has its short end projecting into the hole $E^{15}$, and a spring $E^{16}$, seated in a hole $E^{17}$, bears against it, forcing it upward. A spring $E^{18}$, having its ends seated in a hole $E^{19}$ in the follower and a corresponding hole in the back plate $E^5$ forces the follower forward, and a pin $E^{30}$ projecting from the top of the follower and striking the bar $E^4$ limits the forward movement of the follower. A flat bent lever $E^{20}$ (also Fig. 19) is seated in a slot $E^{21}$ in the side of each of the channel partitions, and is maintained against longitudinal movement by a small pin $E^{22}$ projecting into a hole in the partition. A small flat spring $E^{23}$ presses the forward end of this lever toward the left.

The left hand end channel of each carrier has no partition $E^2$ on its left hand side, the follower $E^8$ being maintained therein by pins $E^{24}$ which project into grooves formed for the purpose on the upper and lower edges of the follower. The L-shaped dog $E^{13}$ of this left hand follower is held in place by a small strap $E^{25}$. As shown in Figs. 3 and 4, there is a continuous line of these carriers extending substantially throughout the length of the machine. When placed thus in juxtaposition, the right hand end wall of each carrier forms a left hand wall for the last channel in the preceding carrier, thus presenting an uninterrupted sequence in the carrier channels. The position of the carriers in the machine is clearly shown in Figs. 3, 4, 8, 9 and 10.

*Carrier advancing mechanism.*—Referring to Figs. 3, 6, 7 and 9: Formed on the under side of the base of the carriers are ratchet-like partial threads $E^{26}$ adapted to coöperate with the threads of a worm $e$ formed on a shaft $e^1$. This shaft has bearings in the blocks $e^2$, $e^2$, $e^2$ seated in a channel $e^3$ in the frame $A^1$. A cover plate $e^4$ closes the portion of this channel between the blocks $e^2$. This worm is continuously rotated in a direction to advance the carriers engaged thereby, toward the right, by means of a gear $e^5$ secured to the end of the shaft $e^1$ which meshes with an intermediate gear $e^6$ pivoted on the right hand end of the frame $A^1$. This gear is in turn driven by a gear $e^7$ on the main shaft P of the machine. In this manner the carrier, engaged by the worm, and the rest of the line in advance thereof, are continuously moved toward the right. Each carrier, as it reaches the extreme of its travel, is returned to the left-hand end of the machine and there added to the line of carriers, as hereinafter fully explained. In their passage through the machine the carrier is guided by a rib $E^{27}$ (Fig. 9) on the upper face of the frame $A^1$ which engages the groove $E^{28}$ in the base of the carrier.

A bar F of a cross section shown in Fig. 9, is supported just above the line of carriers by means of a casting $F^1$ to which such bar is adjustably secured by screws $F^4$. The casting $F^1$ is hinged at $F^3$ $F^3$ to the brackets $F^2$ $F^2$ which are firmly secured to the top of the frame $A^1$. Thumb screws $F^5$, screwing into lugs $F^6$ of the brackets $F^2$, hold the casting $F^1$ in the position shown. When access is desired to the carriers beneath the bar F, the casting $F^1$ may be released by unscrewing the screws $F^5$ and turning the whole member upward about the hinges $F^3$.

*Carrier opening mechanism.*—The left hand end of the bar F is beveled at the back as shown at $F^9$ in Fig. 3. The upper ends of the dogs $E^{13}$ on the followers in the carriers project up behind this bar, and as each carrier starts upon its travel through the machine, these dogs $E^{13}$ are met by the bevel $F^9$ and as the carrier advances the follower is pressed backward in its channel against its spring $E^{18}$, causing the followers to stand in front of the cut-off mechanism as shown in Fig. 19.

In order to permit the free admission of the type into the carrier channel, it is necessary to force the forward end of the bent lever $E^{20}$ into its seat in the channel partition as shown in the channel directly opposite the cut-off in Fig. 21. Mechanism for this purpose is provided as follows. Referring to Figs. 3, 8 and 19 to 21 inclusive: A pin G having a beveled end as shown is carried by a block $G^1$ formed on a shaft $G^2$. This block is free to slide in an opening $G^3$ formed between a casting $G^4$ and a cover plate $G^5$. The ends of the shaft $G^2$ project beyond the casting and are engaged by slotted levers $G^6$ which are secured to a shaft $G^7$ having a bearing in the casting $G^4$. The left hand end of the shaft $G^2$ extends to the left beyond the lever $G^6$ and carries between a collar on its end and the lever $G^6$, a coil spring $G^{10}$ which tends to hold the shaft in the position shown in Fig. 3. Secured to the shaft $G^7$ is a gear segment $G^8$ which meshes with a rack $g$. This rack is guided by a gib $G^9$ projecting from the casting $G^4$ and extends through an opening in the top of the frame $A^1$ and is secured to a link $g^2$ which carries a roll $g^3$ engaging a cam $g^4$ on the main shaft P. This link is pressed downward by a spring $g^5$. The action of these parts is as follows: As a channel of the carrier is coming into position in line with the cut-off, the decreasing face $g^6$ of the cam $g^4$ passes the roll $g^3$, and the link $g^2$ is pressed downward by the spring $g^5$, causing the levers $G^6$ to advance the pin G through a hole $E^{29}$ in the back plate of the carrier. The point of its beveled end enters between the rear end of the lever $E^{20}$ and the partition $E^2$ and forces the forward end of this lever toward the right as shown in Fig. 19. The spring $G^{10}$ on the shaft $G^2$ permits the pin G to travel with the carrier. Upon the insertion of the type in the carrier, the pin G is withdrawn by the increasing face $g^7$ of the cam $g^4$ and the spring $g^{10}$ causes the shaft $G^2$ to move back at once to its initial position ready to insert the pin G into the hole of the next carrier channel.

*Selectors.*—Referring to Figs. 1, 2, 3, 4, 10, 23, 26 and 27: Extending through the distributing portion of the machine are bars H made for convenience in short lengths but secured firmly together as a solid bar by the continuous bar $H^1$. Fitted into equally spaced grooves $H^2$ formed on the rear face of the bar H are the selector plates H³. The portions H⁴ of these plates, which fit into the grooves H², are all of the same thickness. The projecting portions are of varying widths to form between them channels H¹⁰ of different widths corresponding substantially to the thickness of the type to be received in each channel. They are retained in place by strips H⁷ mortised in their upper and lower ends. On the rear edge of each of these selector plates are formed wards H⁸ in positions corresponding with nicks formed in the edges of the type, which are shown on an enlarged scale in Fig. 28. The type are inserted in the carriers with their nicked edges forward in such position that when the follower in the carrier channel is released, its spring presses the type against the rear face of the wards of the selector plate. The dogs E¹³, however, riding against the back edge of the bar F, hold the followers normally in such position that the type passes along just adjacent to the face of the wards of the selectors. The left hand corners of the wards are slightly beveled, as shown in Fig. 27, to avoid catching a type if it projects too far from the carrier.

Secured to the rear face of the bar F is a plate $f$ which has on its upper edge a tongue $f^1$, which projects into a groove F¹² in the bar F to locate the plate accurately. Teeth $f^2$ of the form shown having beveled sides are cut in the lower edge of the plate $f$, the points of the teeth being just flush with the lower face of the bar F. As the carrier advances toward the right, the upwardly projecting ends of the dogs E¹³ meet the beveled sides of these teeth and are depressed against the action of their springs until their upper ends are flush with the lower face of the bar F. This takes place when the type in the carrier channel is directly in front of the selector plate in line with it, permitting the spring E¹⁸ to press the type against the rear faces of the wards. Further movement of the carrier advances the dog E¹³ beyond the depressing tooth of the plate $f$, when, if these wards do not correspond with the nicks of the type, the dog E¹³ snaps up behind the bar F, preventing the follower from pressing the type out of the carrier as the type passes the channel adjacent to the engaged selector. As shown in Fig. 24, shallow notches F¹⁴ are cut in the face of the bar F adjacent to the vertical faces of the teeth $f^2$, thus giving the dogs full opportunity to snap up behind the bar and compensating for any lost movement or lack of accuracy of adjustment. When, however, the wards of the selector correspond with the nicks of the type, as the dog E¹³ is depressed below the bar F, the type will be advanced an amount equal to the depth of its nicks, thus causing the dog to pass beneath the bar F. In the further advancement of the carrier as the type comes in front of the channel adjacent to the engaged selector, the spring behind the follower snaps it out of its channel into the receiving channel. These receiving channels are of a width substantially greater than that of the corresponding type, thus permitting the easy entrance of the type from the moving carrier; but are not wide enough to permit the type when therein to turn on a longitudinal axis. They are connected by means of sheet metal tubes J carried in frames J¹ with type-cases $j$ which are located in line with and below the tubes. It is desirable that the type should be received into the channels of the type-cases on their flat sides. They are ejected from the carriers edge-wise. It is therefore necessary to give the tubes J a quarter twist, as shown, which turns the type as it passes through the tube, to the desired position. Dropping from the tube into the type channel it is received behind the follower $j^1$ (or behind the type already in the channel) and advanced along the channel, out of the path of the succeeding type, by a revolving rod $j^2$ fluted as shown in Fig. 10, to give it a wiper wheel form. This rod has bearings in blocks $j^3$, and is continuously rotated, in a direction which brings its forward side downward, by means of a gear $j^4$. This gear is frictionally secured to the end of the rod, to insure against damage from jamming in case of broken type, etc. This gear is driven by an intermediate gear $j^5$ secured to a block $j^6$ on the rear of the frame A¹, and is in turn driven by a gear $j^7$ secured to the hub of the cam $d^4$ on the main shaft P.

The selector-plate bar H is secured by screws L¹ L¹ to the bars L, L which have sliding bearings in grooves in the upper face of the frame A¹. These bars are tapered on their sides and guided accurately in their grooves by the tapered gibs L². Rack teeth L³ on their lower faces engage gear teeth cut in the shaft L⁴ which has bearings in the brackets L⁵ L⁵ secured to the rear face of the frame A¹. A lever arm L⁶ secured to the right hand end of this shaft has a rounded stud L⁷ which engages a hole in the end of the frame A¹ to hold the shaft in the position shown. By means of the set screws L⁸ the selector-plate bar H may be adjusted accurately against the front face of the frame A¹ in proper relation to the carriers. When access to the carriers or to the inside face of the selectors is required, the lever arm L⁶ is sprung away from the frame sufficiently to release the lug L⁷, and depressed, thereby rotating the shaft L⁴, thus causing the selector bar H to be advanced away from the frame and carriers.

When it is desired to distribute type of a different size of body the screws F⁴ are loosened and the bar F adjusted in or out as required by means of the screws F¹³ (Fig. 10). This bar F is thus adjusted in such position that the followers $E^{11}$ bring the type to the required position as regards the selectors.

*Carrier return mechanism.*—Referring to Figs. 2, 3, 4, 5, 7, 8 and 11: Extending the length of the machine at the rear, carried in bearings $K^1$ $K^1$, is a worm shaft K having the ratchet shaped threads, as shown. (In Figs. 3, 4 and 5 this worm is broken away in order to show parts behind or below it.) This worm is continuously rotated by means of a gear $K^4$ secured adjacent to its left hand bearing. This gear in turn is driven by an intermediate gear $K^3$ which meshes with the gear $K^2$ on the main shaft of the machine. As the endmost carrier reaches the right hand end of its travel, it contacts with a set screw of a release lever $k$ pivoted to the front of the frame of the machine at $k^2$. The horizontal arm of this lever stands below a lug $k^3$ which is secured to an arm $k^4$. This arm, as well as the arm $k^5$ is secured to a casting $k^7$ which is pivoted by a rod $k^8$ to the upper end of the lever $k^9$. The latter arm $k^5$ is pivoted by a stud $k^{35}$ to the casting $k^7$ and is held normally in the position shown, by the spring $k^6$. The lever $k^9$ is secured to the hub of a lever arm $k^{10}$ which is pivoted to a stud $k^{11}$ on the bracket $A^2$. A slot in the end of this lever engages a pin $k^{12}$ on the lever $k^{13}$ which is secured to the shaft $k^{14}$. This shaft extends across the rear of the machine and has bearings in the brackets $A^3$ $A^3$. A weight, (not shown) secured by the wire $k^{15}$ to the lever $k^{13}$ tends to draw these two levers downward. This movement is resisted by the lug $k^3$ which engages the front edge of the frame. As the carrier reaches its extreme position at the right hand end of the machine, it comes in contact with the end of the set-screw on the trip arm $k$ and turns this arm about its pivot sufficiently to raise the lug $k^3$ above the edge of the frame engaged by it. Thereupon the weight secured to the lever arm $k^{13}$ causes the lever arm $k^9$ to be swung rearward. The two arms $k^4$ and $k^5$ engaging the carrier which is directly adjacent to their ends, presses it backward to the rear edge of the frame $A^1$, where the nut $E^6$ of the carrier is engaged by the threads of the worm K. The springs $E^7$ behind the nut $E^6$ permit the nut to yield, in case it does not drop into exact registration with the threads of the worm as the carrier is moved rearward, thus avoiding undue shock of collision. The direction of rotation of the worm is such as to advance the carrier to the left. The groove $E^{28}$ in the bottom of the carrier passing over the rib $K^6$ formed on the top of the frame $A^1$ guides the carrier in its return. A plate $K^7$, pivoted by lugs $K^8$ to the brackets $K^1$ and held in place by buttons $K^9$ at each end, extends above the return track of the carriers and, resting upon them, prevents their displacement in any manner while upon this track.

Arriving at the left hand end of its travel, the nut $E^6$ runs out of the threads of the worm K, and the carrier comes to rest at this point, as shown in Fig. 3. The lengthwise position of the worm, and therefore the final position of the carrier, may be accurately adjusted by means of the set collar $K^5$ which is threaded on the outer end of the worm shaft. The carrier remains standing in this position until the next carrier, which is at the forward end of the front line of carriers, engages and releases the trip lever $k$, causing that carrier to be moved to the return track. At the same time the carrier at the left hand end of the return track is shoved forward by means of a plate $k^{16}$ pivoted to the lever $k^{17}$ and resting upon the worm K directly behind the carrier. This lever $k^{17}$ is secured to the shaft $k^{14}$ to the other end of which the lever $k^{13}$ is secured, as heretofore described. Therefore, as the lever $k^9$ swings rearward, the lever $k^{17}$ swings forward advancing the carrier in front of it to a position in line with the line of carriers. A plate $k^{23}$ seated in a groove in the frame $A^1$ has its upper face beveled, as shown in Fig. 8. As a carrier passes over it, it is depressed in its groove against the spring $k^{43}$ beneath it, and springs up into the groove $E^{28}$ in the bottom of the carrier, thereby guiding the carrier in its movement to the right until the groove $E^{28}$ has passed onto the guiding rib $E^{27}$. As the carrier is advanced from the return track to its forward position, its left hand end meets the curved arm $k^{36}$, pivoted at $k^{37}$, and presses this arm against the action of the spring $k^{38}$ toward the left, when the carrier reaches a position in line with the forward race way, the reaction of the spring advances it toward the right against the end of the preceding carrier, and causes it to follow the movement of that carrier until the threads on the under side of its base are engaged by the worm.

Secured to the shaft $k^{14}$ adjacent to the bracket $A^3$ is a lever arm $k^{18}$, the forked end of which engages a pin $k^{19}$ projecting from a link $k^{20}$. This link is guided in its movement by a slot extending around the shaft $p$, and at its lower end in a groove in the bracket $A^3$. A roll $k^{21}$ pivoted to the upper end of this link is adapted to coöperate with a cam $k^{22}$. This cam is loose on the shaft $p$ and stands normally at rest with the shortest radius of its eccentric portion in line with the roll $k^{21}$, thus permitting the downward movement of the link $k^{20}$ as the carriers at the two ends of the machine are moved by the system above described. Pivoted to the rear side of this cam is a clutch pawl $k^{25}$ pressed by a spring $k^{26}$ toward the continuously revolving clutch disk $k^{27}$. The pawl is held in the position shown by the lever arm $k^{28}$ which is pivoted to the frame of the machine at $k^{29}$ and pressed toward the clutch pawl by a flat spring $k^{30}$. A beveled lug $k^{31}$ projecting from the side of the link $k^{20}$ engages a pin $k^{32}$ projecting from the side of the arm $k^{28}$, pressing the upper end of this arm away from the pawl $k^{25}$ when the link $k^{20}$ descends. This permits the pawl to engage the clutch disk to communicate to the cam $k^{22}$ one complete rotation, during which the increasing face of the cam, meeting the roll $k^{21}$, lifts the link, thereby restoring the plate $k^{16}$ and the arms $k^4$ $k^5$ at the other end of the machine to their normal position, whereupon the lug $k^3$ drops in front of the upper edge of the frame and maintains these parts in position until the trip lever $k^1$ is again actuated to release it. As the link $k^{20}$ rises, the spring $k^{30}$ returns the arm $k^{28}$ to a position to engage the pawl $k^{25}$ to retract it from engagement with the clutch disk and bring the cam to rest.

The arm $k^5$, which is one of the arms that forces the carriers to the rear of the machine at the right hand end of their travel, is pivoted to the casting $k^7$ and held in the position shown by means of the spring $k^6$, as heretofore described. This becomes necessary because the movement of these parts is deliberate and before the arms $k^4$ $k^5$ have been returned to their normal position, out of the path of travel of the carriers, the succeeding carrier will have advanced against the arm $k^5$. The spring $k^6$ permits it to yield and swings it back to its normal position after it is drawn clear of the carrier.

*Two font distribution.*—The type T are nicked as shown in Fig. 28. In apportioning these nicks the length of a type is divided into zones of equal width which are numbered. For the characters of the primary font, that is the most used font, as, for instance, when Roman and italic type are used together, combinations of nicks are selected, consisting of nicks occupying zones which bear numbers, two of which are odd and one even, or else all three zones are of even numbers. The corresponding character of the secondary font (that is the italics) has the same combination of nicks except that it is moved upward upon the type the width of one zone. Thus the two odd and one even numbered nicks of the primary character become two even and one odd numbered nicks on the secondary character, and the three even numbered nicks of the primary character become three odd numbered nicks on the secondary character. Thus there can be no confusion between the nicking of the primary and secondary fonts. The secondary characters also carry one (or, if desirable, two nicks) as $t'$, Fig. 28, which are above or below the zones occupied by nicks on the primary characters. The secondary characters are classified into five groups according to the thickness of the separate type, and all of the type of each group of a similar thickness is provided with the same auxiliary nick $t^1$. At the right hand end of the selector bar F, five channels $H^{12}$ are provided, the selectors of which are formed respectively with wards corresponding to one of the auxiliary nicks of each of the groups of the secondary characters, resulting in the ejection of all of these characters into these channels and their accumulation in the channels of the magazine below. When a considerable amount of this secondary font has thus been separated it is removed from the magazine, broken up into lines and placed in the supply galley of the distributer. The screws $L^1$ which secure the selector-plate bar H to the bars L are loosened, and the shims $L^9$ (Figs. 1, 2 and 10), which are held loosely in place beneath the bar H by screws passing through slots in the plates, are slipped in between the selector plate bar and the slides L. The selector bar is then secured by the screws $L^1$. These shims are just the thickness of one of the zones into which the length of the type body is divided for the nicks. The selectors are all thereby lifted an amount equal to the width of a nick, causing the wards to correspond to the position of the nicks of the corresponding characters of the secondary font, which upon being passed through the machine will be distributed into its proper channels exactly as is the case with the primary font, magazines for their reception being substituted for the magazines of the primary font.

*Power.*—The various movements of the machine are controlled by a main shaft P which has bearings in bosses $P^{32}$ in the frame $A^1$. A belt shifted by a shifter $P^3$ of the ordinary type runs over the pulleys $P^1$ and $P^2$. Of these, the pulley $P^1$ runs loosely upon the shaft and the pulley $P^2$ has a bearing upon the extended hub of the pulley $P^1$. Clutch teeth $P^7$ are formed in the face of the cam $c^{13}$, heretofore referred to, which is secured to the shaft. A collar $P^6$ surrounds the shaft within a seat in the hub of the pulley $P^1$ and has corresponding clutch teeth to engage the teeth $P^7$. This collar is secured to the pulley $P^1$ by a spline $P^8$ fixed to the collar $P^6$ and free to slide in a groove $P^9$ in the pulley $P^1$. A pin $P^{10}$ extending into a hole in the end of the shaft P carries a pin $P^{11}$ which extends out through slots $P^{12}$ in the shaft and engages the collar $P^4$ by means of an annular groove formed between the collar and a cover plate $P^{13}$ secured thereto. The collar $P^6$ may therefore be moved into engagement with the clutch teeth $P^7$ by means of the pin $P^{10}$. When in engagement with the clutch teeth $P^7$, the pulley $P^1$ becomes a tight pulley and serves to drive the shaft P in virtue of the cam $c^{13}$ being secured to the shaft. Pins $P^{14}$ $P^{14}$ passing through the hub of this cam bear against the end of the hub of the gear $e^7$. This gear is loose upon the shaft and has formed in its right hand hub beveled teeth $e^{10}$, as shown in Fig. 5, adapted to engage corresponding beveled teeth on the end of a sleeve P$^{16}$ secured to the shaft. Adjustably secured to the hub of the gear e$^7$ is a member P$^{17}$ formed with the groove P$^{18}$ which is covered by a plate P$^{19}$. Within this groove is a plunger P$^{20}$ pressed upon by a spring P$^{21}$. The plunger P$^{20}$ bears against a pin P$^{22}$ projecting from the side of the cam c$^{13}$ and presses it against the pin P$^{23}$ fixed to the member P$^{17}$. A coil spring p$^{33}$ around the hubs of the cam c$^{13}$ and gear e$^7$ hold the beveled teeth of this gear in engagement with teeth of the sleeve P$^{16}$. It thus results that movement is communicated to the gear e$^7$ through the stud P$^{22}$, the plunger P$^{20}$ and spring P$^{21}$. In case the advancement of the carriers is by any means obstructed, the gear e$^7$ will be retarded as the pull upon it exceeds the tension of the spring P$^{21}$. The sleeve P$^{16}$, continuing to turn with the shaft as the spring P$^{21}$ is compressed, the gear is forced toward the left by the incline of the teeth e$^{10}$, causing the pins P$^{14}$ to press the collar P$^6$ out of engagement from the clutch teeth P$^7$, permitting the machine to come to rest. The gear K$^2$ is similarly driven by a pin P$^{24}$, which is engaged by the end of a plunger P$^{34}$ (Fig. 25) in a groove P$^{26}$ in the side of the gear K$^2$ and pressed against the pin by a spring P$^{35}$ behind the plunger. The plunger and spring are retained in the groove by a plate P$^{36}$ secured to the side of the gear and provided with a slot P$^{38}$ through which the pin P$^{24}$ extends into the groove. The pin P$^{24}$ is secured to a disk P$^{25}$ which is fastened to the shaft. Engaging beveled teeth P$^{37}$ are formed on the hub of the gear and on the disk. Pins P$^{28}$ P$^{28}$ extending from the gear K$^2$ to the gear e$^7$ pass through the sleeve P$^{16}$. It results from this arrangement that if a carrier on the return track is obstructed in its movement, relative movement between the disk P$^{25}$ and the obstructed gear K$^2$, as the spring P$^{26}$ is compressed, the gear is moved to the left by the engaging bevels of the teeth P$^{37}$. This movement is communicated through the pins P$^{28}$, the gear e$^7$ and the pins P$^{14}$ to press the collar P$^6$ out of engagement with the clutch teeth P$^7$, permitting the machine to come to rest. A hand wheel P$^{40}$ secured to the end of the hub of the pulley P$^1$ affords facility for turning the shaft P by hand when it is desired to do so.

Passing through the bracket B$^{16}$ (Fig. 7) which supports the rod B$^7$ upon which the galley arm B$^6$ slides, is a pin s secured to lug s$^1$ projecting from a slide s$^2$, carried in a groove of a plate s$^3$ on the end of the frame A$^1$. A notch s$^4$ in this slide engages an arm s$^5$ pivoted at s$^6$. A spring s$^7$ holds the parts in the position shown. This arm s$^5$ stands in line with the lug s$^8$ projecting from the hub of the gear e$^6$. When all the type has been fed from the galley by the ejector blade b the arm B$^6$ coming into contact with the pin s, presses it backward, causing the arm s$^5$ to swing into the path of the lug s$^8$, thereby stopping that gear and causing the beveled teeth e$^{10}$ to break the connection between the pulley P$^1$ and the shaft of the machine as heretofore described, permitting the machine to come to rest. A worm P$^{38}$ on the shaft P drives the corresponding worm wheel P$^{39}$ on the shaft p. The clutch disks b$^{13}$ and k$^{27}$ heretofore referred to, are formed integral with this worm wheel. The worm is driven frictionally by means of washers P$^{29}$ and the adjustment nut P$^{30}$.

Having thus described my invention, I claim:—

1. In a distributing mechanism, the combination of type-receiving channels, a type-carrier, a spring-pressed follower tending to eject the type, and means for alternately holding the follower against and releasing it to the action of its spring for each receiving channel.

2. In distributing mechanism, the combination of a carrier, a spring-pressed follower therein, means for restraining the movement of the follower, means for temporarily and periodically releasing such follower, and means whereby such release becomes effectual when the type belongs to the channel adjacent thereto.

3. In a distributing mechanism, the combination of a type-carrier, means tending to eject the type from the carrier, means periodically retaining and releasing the ejecting means, and selecting mechanism adapted to render the ejecting means effective when the type corresponds therewith.

4. In distributing mechanism, the combination of a type carrier, means tending to eject the type therefrom, mechanism adapted to periodically release said means to action, and selecting mechanism determining whether such release is effective to eject the type.

5. In distributing mechanism, the combination of a spring-pressed follower, means for temporarily and periodically releasing the same, and a selector controlling the movement of the follower and allowing it when released to move to a position preventing reëngagement of the releasing device.

6. In distributing mechanism, the combination of means for holding the type, spring-actuated means for ejecting the same, selecting means adapted to oppose the action of the ejecting means or allow its action, and releasing means adapted to give the selecting means an opportunity to act.

7. In distributing mechanism, the combination of a series of selectors, a type carrier, mechanism for moving it past the selectors, means for ejecting type from the carrier, said means being prevented from action when the type do not correspond with the selectors, and means for releasing such ejecting means to present the type to the selectors.

8. In distributing mechanism, the combination of a series of selectors, type channels between them, a type carrier, means for causing it to travel across the selectors and channels, means traveling with the carrier tending to eject the type therefrom, said selectors holding such ejecting means idle when the type do not correspond with the selectors, and means acting to hold the ejecting means idle when the type are not in engagement with the selectors.

9. In distributing mechanism, the combination of alternately arranged selectors and type channels, a type carrier, means for moving it across the selectors and channels, ejecting mechanism, means for rendering the same active to eject the type when the selectors allow such ejection.

10. In distributing mechanism, the combination with a type carrier of selectors adapted to control the ejection of type from the carrier, means for ejecting type from the carrier, means restraining such ejection, and means for releasing such restraining means, whereby the selectors may determine the ejection or non-ejection of the type.

11. In distributing mechanism, the combination of a type carrier, means tending to eject the type therefrom, mechanism for restraining the ejecting means, and means for periodically releasing the ejecting means.

12. The combination of an ejecting means, means engaging the ejecting means to prevent its action and periodically releasing the same, a series of selectors, and means preventing the reëngagement of the releasing means when the type correspond to the selector.

13. In distributing mechanism, the combination of a type carrier, means tending to eject type therefrom, mechanism for periodically engaging and releasing said means, and selectors for rendering such release effective for the ejection of the type.

14. The combination in distributing mechanism of a series of selectors, a carrier, means for moving the same adjacent to the selectors, a follower in the carrier, means acting on the follower and tending to eject type, and means for alternately engaging and releasing such follower.

15. In distributing mechanism, the combination of a series of selectors having wards, a carrier adapted to travel across the selectors and carrying type with nicking presented to the wards, means for ejecting the type, said means being prevented from acting by the wards engaging the type when the nicking of the type does not correspond with such wards, and additional means for preventing the ejector acting when the type are not in engagement with the wards.

16. In distributing mechanism, the combination of a series of selectors, a carrier adapted to travel across the selectors and carry nicked type, means for ejecting the type, said means being prevented from acting by the selectors engaging the type when the nicking of the type does not correspond therewith, and means for rendering active the ejecting means periodically as the type are presented to the selectors.

17. In distributing mechanism, the combination of a series of selectors having wards, means for advancing type across the selectors, means tending to remove the type from its holder, a lock for such removing means, means for periodically releasing the lock as the type are presented to the selectors, and means for rendering such release effective when the type correspond with the wards.

18. In distributing mechanism, the combination of alternately arranged selectors and type channels, a carrier, means for ejecting type from the carrier, means for alternately releasing and locking such ejection, the release corresponding to the time when the type are presented to the selector, and the locking corresponding to the time when the type are opposite the type channels.

19. In distributing mechanism, the combination of a series of selectors, a carrier, a follower therein, means tending to move the follower to eject the type, locking means preventing such ejection, means for releasing the locking means when the type are presented to the selectors, the selectors having wards preventing effective movement of non-corresponding type but allowing movement of corresponding type to bring the follower into position preventing reëngagement of the locking means.

20. The combination of a follower, a dog for locking the same, a bar engaged by the dog, and means for periodically releasing the dog from the bar.

21. The combination of a follower having a spring-pressed dog, a bar engaged by the dog, and a notched bar for depressing the dog out of such engagement with the bar first mentioned.

22. The combination with a type carrier of a spring-actuated follower therein, a spring pressed dog carried thereby, a bar which said dog engages, a notched bar adapted to periodically move the dog from such engagement, and means for moving the follower lengthwise of such bars.

23. The combination of a follower, a spring-pressed dog carried thereby, a bar which said dog engages, a notched bar adapted to periodically move the dog from such engagement, and means for advancing the follower to prevent reëngagement.

24. The combination of a spring-actuated follower, a spring-actuated dog carried thereby, and a bar with which said dog engages.

25. The combination with a cut-off blade, of mechanism for advancing type thereto, said mechanism being operated by a light pressure to bring the type within range of the cut-off blade, and thereafter by a strong pressure to advance the type across the cut-off blade.

26. In distributing mechanism, the combination of a carrier, means for removing a type from the end of a line of type by spring pressure, and means for advancing it into the carrier by a controlled movement.

27. The combination of a type carrier, and mechanism for feeding type thereinto comprising means for applying pressure to the type before release thereof, allowing partial advancement when released, and means for then causing a controlled advancement into the carrier.

28. The combination of carriers adapted to travel about a four-way circuit, means for moving them on the advance and return portions of the circuit, and levers for moving them from each of such portions to the other, in combination with a cam to return the levers, and means actuated by the levers for initiating the movement of the cam.

29. The combination of carriers adapted to travel about a four-way circuit, means for moving them on the advance and return portions of the circuit, and levers for moving them from each of such portions to the other, in combination with means actuated by a carrier for initiating the operation of the levers.

30. The combination of a series of carriers each having a segment of a nut, a driving worm with which they may engage, means for moving the carriers into line with the worm, and means for advancing each carrier against the preceding carrier until engaged by the worm.

31. In a distributing machine, the combination with a carrier of an advancing mechanism therefor and a returning mechanism therefor, throwout devices for each advancement, and means whereby one throwout actuates the other.

32. The combination of a series of type channels, a front plate therefor, a rack bar connected therewith, a gear meshing with the rack bar, and means for rotating the gear to move the front plate in or out.

33. In a machine adapted to distribute a plurality of fonts of type, a series of selectors mounted as a unit on one bar, and means for adjusting the position of said bar.

34. In a type-distributing mechanism, the combination of movable carriers recessed to receive the individual type, spring-actuated ejectors mounted in the carriers and tending to deliver the type sidewise therefrom, a series of selectors having teeth in variant forms to act on the side faces of the passing type, channels between the selectors to receive the ejected type, means for locking each ejector momentarily out of action when the adjacent type is held back by a selector; whereby each ejector is left free to deliver the corresponding type whenever the latter fails to correspond as to its nicks with the preceding selector.

35. In a type-composing machine, a row of variant selectors, intermediate type channels, carriers adapted to present individual type successively opposite the selectors and the channels, ejectors tending to deliver the type from the carriers, and means for momentarily preventing the action of each ejector whenever the adjacent type fails to match the selector to which it is presented.

In testimony whereof, I hereunto affix my signature in the presence of two witnesses.

FRANCIS B. CONVERSE, Jr.

Witnesses:
ALBERT H. BATES,
H. R. SULLIVAN.